US012094409B2

(12) United States Patent
Cheng et al.

(10) Patent No.: US 12,094,409 B2
(45) Date of Patent: Sep. 17, 2024

(54) PIXEL CIRCUITRY AND DRIVING METHOD THEREOF, ARRAY SUBSTRATE AND DISPLAY PANEL

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Hongfei Cheng, Beijing (CN); Xueguang Hao, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/044,114

(22) PCT Filed: Feb. 7, 2021

(86) PCT No.: PCT/CN2021/075706
§ 371 (c)(1),
(2) Date: Mar. 6, 2023

(87) PCT Pub. No.: WO2022/165782
PCT Pub. Date: Aug. 11, 2022

(65) Prior Publication Data

US 2023/0343287 A1 Oct. 26, 2023

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01);
(Continued)

(58) Field of Classification Search
CPC ......... G09G 3/3233; G09G 2300/0819; G09G 2300/0852; G09G 2300/0861;
(Continued)

(56) References Cited

U.S. PATENT DOCUMENTS

2013/0057532 A1 3/2013 Lee et al.
2014/0184665 A1 7/2014 Yoon et al.
(Continued)

FOREIGN PATENT DOCUMENTS

CN 103915061 A 7/2014
CN 105825815 A 8/2016
(Continued)

OTHER PUBLICATIONS

International Search Report issued for International Application No. PCT/CN2021/075706, mailed on Oct. 28, 2021.
(Continued)

*Primary Examiner* — Patrick N Edouard
*Assistant Examiner* — Joseph P Fox
(74) *Attorney, Agent, or Firm* — Raj S. Dave; Dave Law Group LLC

(57) ABSTRACT

Embodiments of the present disclosure provide a pixel circuitry, a drive method thereof, an array substrate and a display panel. The pixel circuitry may comprise a drive circuit, a data write circuit, an initialization circuit, a first light emission control circuit, a first storage circuit, a second storage circuit and a second light emission control circuit. The drive circuit may be coupled to a first node, a second node and a third node, and may provide a drive current to a light emitting device. The first storage circuit may store a voltage difference between the first voltage signal terminal and the second node. The second storage circuit may store a voltage difference between the first node and the second node.

12 Claims, 12 Drawing Sheets

(52) U.S. Cl.
CPC . *G09G 2300/0861* (2013.01); *G09G 2310/08* (2013.01); *G09G 2320/0223* (2013.01); *G09G 2320/0233* (2013.01); *G09G 2320/045* (2013.01)

(58) Field of Classification Search
CPC ....... G09G 2310/08; G09G 2320/0223; G09G 2320/0233; G09G 2320/045; G09G 2300/0842
See application file for complete search history.

(56) References Cited

U.S. PATENT DOCUMENTS

| | | | |
|---|---|---|---|
| 2018/0005576 A1 | 1/2018 | Yoon et al. | |
| 2018/0122301 A1 | 5/2018 | Yoon et al. | |
| 2022/0122531 A1 * | 4/2022 | Zheng .................. | G09G 3/3233 |
| 2022/0343842 A1 | 10/2022 | Yu | |

FOREIGN PATENT DOCUMENTS

| | | | | |
|---|---|---|---|---|
| CN | 107564476 | A | | 1/2018 |
| CN | 108010485 | A | | 5/2018 |
| CN | 111179820 | A | * | 5/2020 |
| CN | 111477178 | A | | 7/2020 |
| EP | 3723077 | A1 | | 10/2020 |

OTHER PUBLICATIONS

Written Opinion of the International Searching Authority issued for International Application No. PCT/CN2021/075706, mailed on Oct. 28, 2021.

Search Report issued for European Application No. 21923795.5, mailed on Oct. 5, 2023. 13 pages.

* cited by examiner

PIXEL CIRCUITRY AND DRIVING METHOD THEREOF, ARRAY SUBSTRATE AND DISPLAY PANEL

CROSS REFERENCE TO RELATED APPLICATIONS

This patent application is a National Stage Entry of PCT/CN2021/075706 filed on Feb. 7, 2021, the disclosure of which is incorporated by reference herein in its entirety as part of the present application.

FIELD

Embodiments of the present disclosure relate to the field of display technologies, and particularly, to a pixel circuitry and a driving method thereof, an array substrate and a display panel.

BACKGROUND

With the progress of display technologies, a new generation of organic light emitting diode (OLED) display apparatuses have lower manufacturing cost, faster response speed, higher contrast ratio, wider viewing angle, and larger operating temperature range than conventional liquid crystal display (LCD) apparatuses. Generally, multiple pixel units arranged in an array are provided in an OLED display panel. The pixel units in a same row are connected to a same gate line, and the pixel units in a same column are connected to a same data line. Each pixel unit can display under the drive of a scanning signal provided by the gate line and a data signal provided by the data line.

SUMMARY

Embodiments of the present disclosure provide a pixel circuitry, a driving method thereof, an array substrate and a display panel.

A first aspect of the present disclosure provides a pixel circuitry. The pixel circuitry may include a drive circuit, a data write circuit, an initialization circuit, a first light emission control circuit, a first storage circuit, a second storage circuit, and a second light emission control circuit. The drive circuit may be coupled to a first node, a second node and a third node, and may provide a drive current to a light emitting device. The data write circuit may be coupled to the first node, and may provide a data signal from a data signal terminal to the drive circuit according to a drive signal from a drive signal terminal. The initialization circuit may provide an initialization signal from an initialization signal terminal to the second node according to a reset signal from a reset signal terminal. The first light emission control circuit may provide a first voltage signal from a first voltage signal terminal to the third node according to a first light emission control signal from a first light emission control signal terminal. The first storage circuit can may a voltage difference between the first voltage signal terminal and the second node. The second storage circuit may store a voltage difference between the first node and the second node. The second light emission control circuit may control to provide the drive current to the light emitting device according to a second light emission control signal from a second light emission control signal terminal.

In the embodiment of the present disclosure, the first storage circuit may include a first capacitor. The first capacitor can be coupled between the first voltage signal terminal and the second node. The second storage circuit may include a second capacitor. The second capacitor may be coupled between the first node and the second node.

In an embodiment of the present disclosure, the data write circuit may include a first transistor. A control electrode of the first transistor is coupled to the drive signal terminal, a first electrode of the first transistor is coupled to the data signal terminal, and a second electrode of the first transistor is coupled to the first node.

In an embodiment of the present disclosure, the initialization circuit may include a second transistor. A control electrode of the second transistor is coupled to the reset signal terminal, a first electrode of the second transistor is coupled to the initialization signal terminal, and a second electrode of the second transistor is coupled to the second node.

In the embodiment of the present disclosure, the first light emission control circuit may include a third transistor. A control electrode of the third transistor is coupled to the first light emission control signal terminal, a first electrode of the third transistor is coupled to the first voltage signal terminal, and a second electrode of the third transistor is coupled to the third node.

In the embodiment of the present disclosure, the second light emission control circuit may include a fourth transistor. A control electrode of the fourth transistor is coupled to the second light emission control signal terminal, a first electrode of the fourth transistor is coupled to the second node, and a second electrode of the fourth transistor is coupled to the light emitting device.

In embodiments of the present disclosure, the drive circuit may include a drive transistor. A control electrode of the drive transistor is coupled to the first node, a first electrode of the drive transistor is coupled to the second node, and a second electrode of the drive transistor is coupled to the third node.

In the embodiment of the present disclosure, the data write circuit can further provide a reference signal from the data signal terminal to the drive circuit according to the drive signal.

In the embodiment of the present disclosure, the pixel circuitry may also include a third storage circuit, a first reference circuit and a second reference circuit. An end of the third storage circuit is coupled to the first node, and another end of the third storage circuit is coupled to the data write circuit via a fourth node, and wherein the third storage circuit is configured to store a voltage difference between the fourth node and the first node. The first reference circuit may provide a first reference signal from a first reference signal terminal to the first node according to the reset signal. The second reference circuit may provide a second reference signal from a second reference signal terminal to the fourth node according to the reset signal.

In the embodiment of the present disclosure, the third storage circuit may include a third capacitor. The third capacitor may be coupled between the fourth node and the first node.

In an embodiment of the present disclosure, the first reference circuit may include a fifth transistor. A control electrode of the fifth transistor is coupled to the reset signal terminal, a first electrode of the fifth transistor is coupled to the first reference signal terminal, and a second electrode of the fifth transistor is coupled to the first node. The second reference circuit may include a sixth transistor. A control electrode of the sixth transistor is coupled to the reset signal terminal, a first electrode of the sixth transistor is coupled to the second reference signal terminal, and a second electrode of the sixth transistor is coupled to the fourth node.

In the embodiment of the present disclosure, the first reference signal and the second reference signal are the same.

A second aspect of the present disclosure provides a method for driving a pixel circuitry according to embodiments of the present disclosure. In an initialization phase, the drive signal and the reset signal may be provided to turn on the data write circuit and the initialization circuit. A reference signal from the data signal terminal may be provided to the first node via the data write circuit. The initialization signal may be provided to the second node via the initialization circuit. In a compensation phase, the drive signal and the first light emission control signal may be provided to turn on the data write circuit and the first light emission control circuit. The first voltage signal may be provided to the third node via the first light emission control circuit. The first storage circuit and the second storage circuit may be charged to compensate the drive circuit. In a data write phase, the drive signal may be provided to turn on the data write circuit, to provide a data signal from the data signal terminal to the first node. In a light emission phase, the first light emission control signal and the second light emission control signal may be provided to turn on the first light emission control circuit and the second light emission control circuit. A drive current of the drive circuit may be provided to the light emitting device such that the light emitting device emits light.

A third aspect of the present disclosure provides a method for driving a pixel circuitry according to embodiments of the present disclosure. In an initialization phase, the reset signal may be provided to turn on the initialization circuit, the first reference circuit and the second reference circuit. The initialization signal may be provided to the second node via the initialization circuit. The first reference signal may be provided to the first node via the first reference circuit. The second reference signal may be provided to the fourth node via the second reference circuit. In a compensation phase, the first light emission control signal may be provided to turn on the first light emission control circuit. The first voltage signal may be provided to the third node via the first light emission control circuit. The first storage circuit, the second storage circuit and the third storage circuit may be charged to compensate the drive circuit. In a data write phase, the drive signal may be provided turn on the data write circuit, to provide a data signal from the data signal terminal to the fourth node. In a light emission phase, the first light emission control signal and the second light emission control signal may be provided to turn on the first light emission control circuit and the second light emission control circuit. A drive current of the drive circuit may be provided to the light emitting device such that the light emitting device emits light.

A fourth aspect of the present disclosure provide an array substrate. The array substrate may include a plurality of pixel circuitries according to the first aspect of the present disclosure.

A fifth aspect of the present disclosure provides a display panel. The display panel may include the array substrate according to the fourth aspect of the present disclosure.

BRIEF DESCRIPTION OF THE DRAWINGS

To describe the technical solutions of the present disclosure more clearly, the accompanying drawings of the embodiments will be briefly introduced below. It is to be known that the accompanying drawings in the following description merely involve with some embodiments of the present disclosure, but not limit the present disclosure, in which.

DETAILED DESCRIPTION

Figure 1:
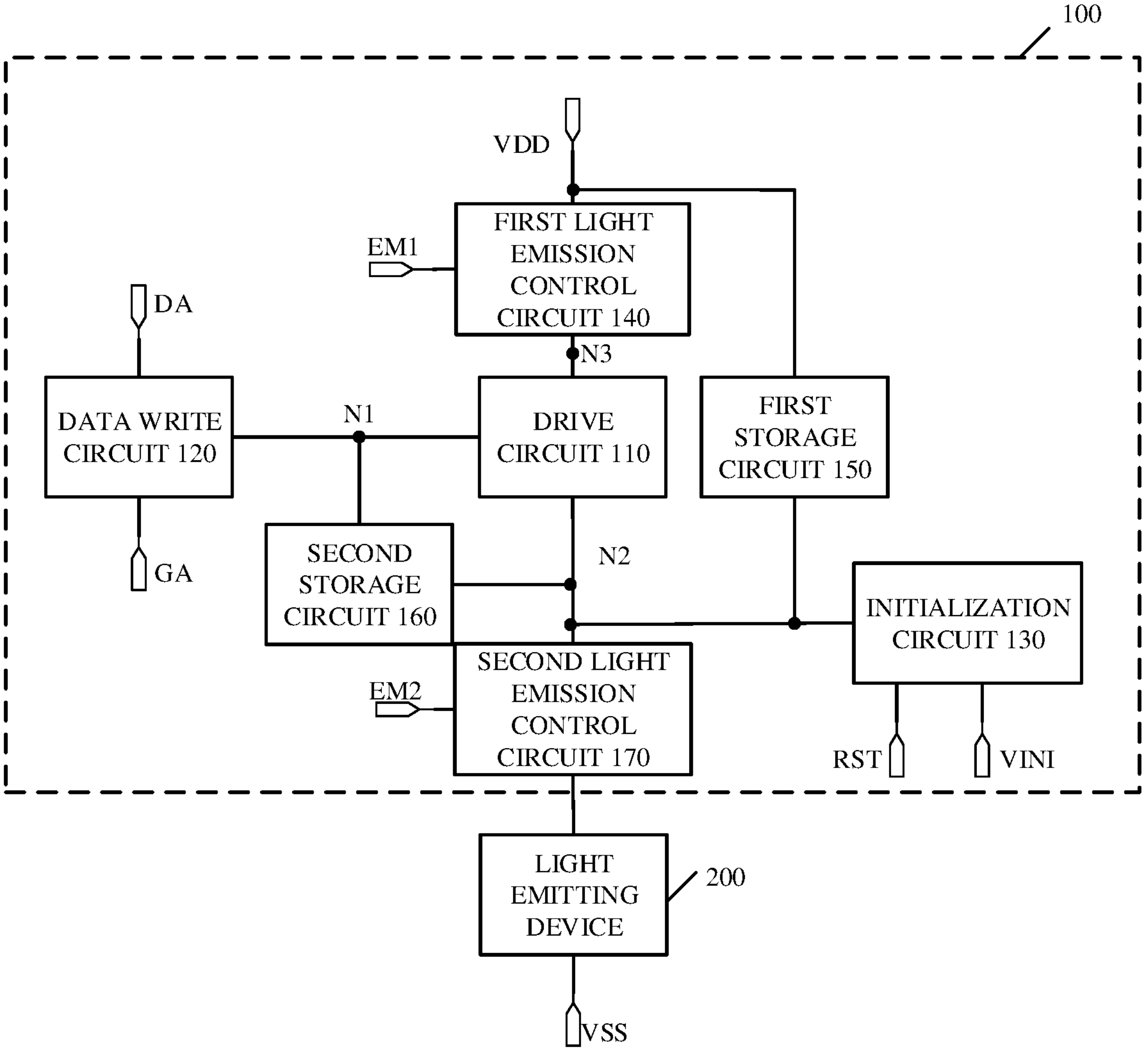
FIG. 1 shows a schematic block diagram of a pixel circuitry according to an embodiment of the present disclosure.

To make technical solutions and advantages of the embodiments of the present disclosure clearer, the technical solutions in the embodiments of the present disclosure will be described clearly and completely below, in conjunction with the accompanying drawings. Apparently, the described embodiments are merely some but not all of the embodiments of the present disclosure. All other embodiments obtained by those of ordinary skill in the art based on the described embodiments without creative efforts shall fall within the protection scope of the present disclosure.

In the description of the present disclosure, unless otherwise stated, the technical terms or scientific terms in the present disclosure can be of a common meaning understood by the skilled in the art that the present disclosure belongs. The terms "first", "second" and similar words used in this disclosure do not indicate any order, quantity or importance, but are only used to distinguish different components. Similarly, similar words such as "a", "an" or "the" do not indicate quantity, but indicate existence of at least one. "Multiple" means two or more. Words such as "comprising" or "including" mean that the elements or objects appearing before the words cover the elements or objects listed after the words and their equivalents, without excluding other elements or objects. Words like "connecting" or "coupling" are not limited to physical or mechanical connection, but can include electrical connection, direct connection or indirect connection. The terms "above", "below", "left", "right", or the like are only used to represent the relative position relationship. When the absolute position of the described object changes, the relative position relationship may also change accordingly.

Various embodiments according to the present disclosure will be described in detail below with reference to the accompanying drawings. It is to be noted that, in the drawings, like reference numbers indicate components having substantially the same or similar structures and functions. Repeated descriptions of them will be omitted.

An OLED display device usually includes a plurality of pixel units arranged in an array. Each pixel unit can realize basic functions of driving OLED to emit light via a pixel circuitry. In general, current between a source and a drain of a drive transistor can be controlled by changing a voltage of a gate of the drive transistor that directly drives the OLED to emit light, thereby achieving the change of brightness of the light emitted. However, in a process of manufacturing drive transistors, threshold voltages of different drive transistors may be different due to process deviation. The threshold voltage of the drive transistor may drift with elapse of working time and change of working environment. On the other hand, in a display device, different positions in each pixel unit may also lead to different voltage drops (I-R Drop) of the power supply, which may affect the currents driving the OLEDs. In addition, because capacitance of each OLED in the OLED display device may be different, the drive currents may be affected.

Embodiments of the present disclosure provides a pixel circuitry, a driving method thereof, an array substrate and a display panel. In the pixel circuitry, deviation and drift of threshold voltage of drive transistor can be compensated. Brightness difference between OLEDs at a far position and a near position to a power supply caused by IR Drop can be compensated. Influence of capacitance of the OLED itself can be avoided. Wrong light emission of OLED can be prevented. Thus, display quality of the display panel comprising the pixel circuitry can be improved.

FIG. 1 shows a schematic block diagram of a pixel circuitry according to an embodiment of the present disclosure. As shown in FIG. 1, the pixel circuitry 100 may include a drive circuit 110, a data write circuit 120, an initialization circuit 130, a first light emission control circuit 140, a first storage circuit 150, a second storage circuit 160, and a second light emission control circuit 170. In an embodiment, the pixel circuitry 100 may be used to drive a light emitting device 200 in a corresponding pixel unit to emit light.

As shown in FIG. 1, a control end of the drive circuit 110 may be coupled to a first node N1, a first end of the drive circuit 110 may be coupled to a second node N2, and a second end of the drive circuit 110 may be coupled to a third node N3. The drive circuit 110 may provide a drive current $I_{DS}$ to the light emitting device 200. For example, the drive circuit 110 may provide a drive current $I_{DS}$ for driving the light emitting device 200 to emit light according to a voltage difference between the control end and the first end (that is, the voltage difference between the first node N1 and the second node N2).

The data write circuit 120 can receive a drive signal via a drive signal terminal GA, and receive a data signal or a reference signal via a data signal terminal DA. The data write circuit 120 can also be coupled to the first node N1, and then to the control end of the drive circuit 110. In the embodiment, the data write circuit 120 can provide the data signal or reference signal from the data signal terminal DA to the first node N1, that is, the control end of the drive circuit 110, according to the drive signal from the drive signal terminal GA. In an example, the drive signal terminal GA can be connected with a gate line corresponding to the pixel unit, such that the drive signal can be a scanning signal for the pixel unit. In addition, the data signal terminal DA can be connected with a data line corresponding to the pixel unit. The data line can provide a data signal or a reference signal in different time periods accordingly.

In an embodiment of the present disclosure, the data write circuit 120 can be directly connected with the first node N1 to directly provide the required signal to the N1 node, as shown in FIG. 1. In addition, the data write circuit 120 can also be indirectly connected with the first node N1 to indirectly provide the required signal to the N1 node, as will be described in detail below in connection with FIG. 3.

The initialization circuit 130 may receive a reset signal via a reset signal terminal RST and an initialization signal via an initialization signal terminal VIN1. The initialization circuit 130 may also be coupled to the second node N2, and thus to the first end of the drive circuit 110. In an embodiment, the initialization circuit 130 can provide the initialization signal from the initialization signal terminal VIN1 to the second node N2, that is, the first end of the drive circuit 110, according to the reset signal from the reset signal terminal RST.

The first light emission control circuit 140 may receive a first light emission control signal via a first light emission control signal terminal EM1, and receive a first voltage signal via a first voltage signal terminal VDD. The first light emission control circuit 140 can also be coupled to the third node N3, and then to the second end of the drive circuit 110. In an embodiment, the first light emission control circuit 140 can provide the first voltage signal from the first voltage signal terminal VDD to the third node N3, that is, the second terminal of the drive circuit 110, according to the first light emission control signal from the first light emission control signal terminal EM1.

The first storage circuit 150 can be coupled with the first voltage signal terminal VDD and the second node N2 to store a voltage difference between the first voltage signal terminal VDD and the second node N2.

The second storage circuit 160 may be coupled with the first node N1 and the second node N2 to store a voltage difference between the first node N1 and the second node N2.

The second light emission control circuit 170 may receive a second light emission control signal via a second light emission control signal terminal EM2. The second light emission control circuit 170 can also be coupled to the second node N2, thereby coupling with the first end of the drive circuit 110. In addition, the second light emission control circuit 170 may be coupled to the light emitting device 200. In an embodiment, the second light emission control circuit 170 can control to provide the drive current $I_{DS}$ to the light emitting device 200 according to the second light emission control signal from the second light emission control signal terminal EM2. That is, the second light emission control circuit 170 can control the connection/disconnection between the drive circuit 110 and the light emitting device 200 according to the second light emission control signal, thereby preventing the light emitting device 200 from emitting light by mistake, and effectively isolating effect of capacitance of the light emitting device 200 itself on the drive current $I_{DS}$.

In addition, an end of the light emitting device 200 can be coupled with the second light emission control circuit 170, and the other end can be coupled with a second voltage signal terminal VSS to receive a second voltage signal. In an embodiment, the light emitting device 200 can emit light according to the drive current $I_{DS}$ provided by the drive circuit 110 under the control of the first light emission control circuit 140 and the second light emission control circuit 170.

In an embodiment of the present disclosure, the drive current $I_{DS}$ in the drive circuit 110 is only related to the data signal and reference signal from the data signal terminal DA. Specific analysis will be described below. As the drive current $I_{DS}$ is independent from characteristics of elements in the drive circuit 110 and a power supply voltage (for example, the first voltage signal, the second voltage signal), brightness uniformity of the display can be improved. Moreover, the second light emission control circuit 170 can separate the drive circuit 110 from the light emitting device 200 in a non-luminous (non-light emission) phase, thereby preventing the light emitting device 200 from emitting light by mistake, and avoiding the effect of the capacitance of the light emitting device 200 itself on the drive current $I_{DS}$.

It can be noted that, in an embodiment of the present disclosure, the first voltage signal terminal VDD, for example, maintains to provide a direct-current (DC) high voltage level signal, which is referred to a first voltage. The second voltage signal terminal VSS, for example, maintains to provide a DC low voltage level signal. The DC low voltage level can be referred to as the second voltage, which is lower than the first voltage. Furthermore, in an example, the initialization signal terminal VIN1 maintains to provide a DC low voltage level signal. Similar configuration can be implemented in the following embodiments, thus repeated descriptions will be omitted.

Moreover, in an embodiment of the present disclosure, the first node N1, the second node N2, the third node N3 and a fourth node N4 (which is described later) may not represent actual components, but represent junction points of the related circuits in the circuit diagram. Similar configuration can be implemented in the following embodiments, thus repeated descriptions will be omitted.

Figure 2:
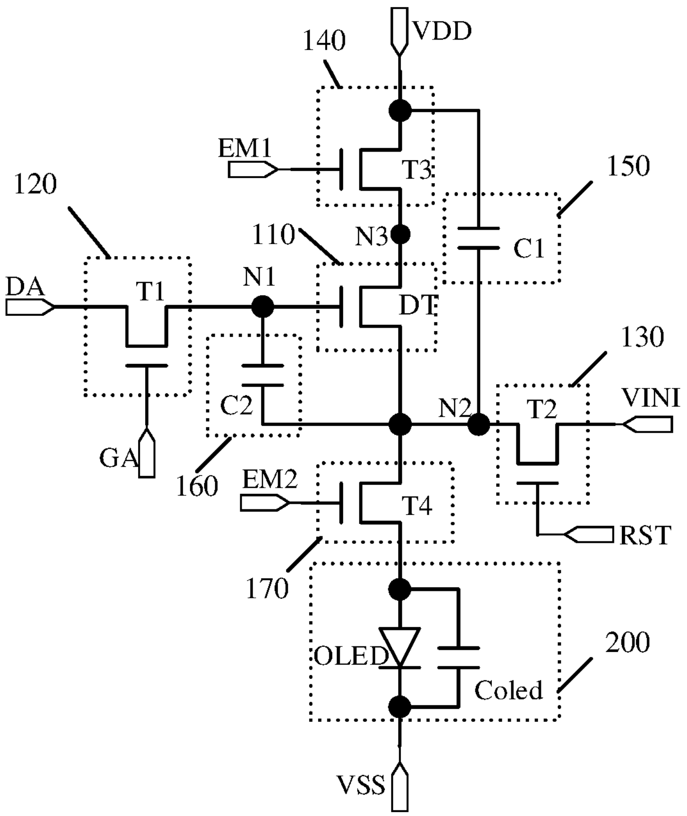
FIG. 2 shows an exemplary circuit diagram of a pixel circuitry according to an embodiment of the present disclosure.

FIG. 2 shows an exemplary circuit diagram of a pixel circuitry according to an embodiment of the present disclosure, in which the pixel circuitry may be, for example, the pixel circuitry 100 of FIG. 1. As shown in FIG. 2, the pixel circuitry may include a drive transistor DT, a first transistor T1, a second transistor T2, a third transistor T3, a fourth transistor T4 (for example, T1-T4 may be switching transistors), a first capacitor C1, and a second capacitor C2.

In an embodiment, the transistors adopted can be N-type transistor or P-type transistor. Specifically, the transistors can be an N-type or P-type field effect transistor (MOSFET), or an N-type or P-type bipolar transistor (BJT). In an embodiment of the present disclosure, a gate of the transistor can be referred to as a control electrode. As a source and a drain of a transistor are symmetrical, the source and drain may not be distinguished. That is, the source of a transistor can be a first electrode (or a second electrode) and the drain of a transistor can be the second electrode (or the first electrode).

In an embodiment of the present disclosure, the transistors may be described as N-type field effect transistors (NMOS) as an example. For example, the N-type transistor can be turned on in response to a high voltage level signal of the control electrode.

As shown in FIG. 2, the drive circuit 110 may include a drive transistor DT. A control electrode of the drive transistor DT can be used as the control terminal of the drive circuit 110 and can be coupled to the first node N1. A first electrode of the drive transistor DT, as the first end of the drive circuit 110, can be coupled to the second node N2. A second electrode of the drive transistor DT, as the second end of the drive circuit 110, can be coupled to the third node N3. For example, the drive transistor DT may be an N-type transistor.

The data write circuit 120 may include a first transistor T1. A control electrode of the first transistor T1 may be coupled to the drive signal terminal GA to receive the drive signal. A first electrode of the first transistor T1 may be coupled to the data signal terminal DA to receive the data signal or reference signal. A second electrode of the first transistor T1 may be coupled to the first node N1 (the control electrode of the drive transistor DT). In an example, the first transistor T1 may be an N-type transistor.

The initialization circuit 130 may include a second transistor T2. A control electrode of the second transistor T2 may be coupled to the reset signal terminal RST to receive the reset signal. A first electrode of the second transistor T2 may be coupled to the initialization signal terminal VIN1 to receive the initialization signal. A second electrode of the second transistor T2 may be coupled to second node N2 (the first electrode of the drive transistor DT). In an example, the second transistor T2 may be an N-type transistor.

The first light emission control circuit 140 may include a third transistor T3. A control electrode of the third transistor T3 may be coupled to the first light emission control signal terminal EM1 to receive the first light emission control signal. A first electrode of the third transistor T3 may be coupled to the first voltage signal terminal VDD to receive the first voltage signal. A second electrode of the third transistor T3 may be coupled to the third node N3 (the second electrode of the drive transistor DT). In an example, the third transistor T3 may be an N-type transistor.

The first storage circuit 150 may include a first capacitor C1. A first end of the first capacitor C1 may be coupled to the first voltage signal terminal VDD, and a second end of the first capacitor C1 may be coupled to the second node N2.

The second storage circuit 160 may include a second capacitor C2. A first end of the second capacitor C2 may be coupled to the first node N1, and a second end of the second capacitor C2 may be coupled to the second node N2.

The second light emission control circuit 170 may include a fourth transistor T4. A control electrode of the fourth transistor T4 may be coupled to the second light emission control signal terminal EM2 to receive the light emission control signal. A first electrode of the fourth transistor T4 may be coupled to the second node N2. A second electrode of the fourth transistor T4 may be coupled to the light emitting device 200. In an example, the fourth transistor T4 may be an N-type transistor.

It is to be understood that, one or more of the drive circuit 110, the data write circuit 120, the initialization circuit 130, the first light emission control circuit 140, the first storage circuit 150, the second storage circuit 160, and the second light emission control circuit 170 may also be circuits with other elements, and are not limited to the above description.

In addition, the light emitting device 200 may be an OLED, such as in various types, e.g., top emitting, bottom emitting, bilateral emitting, or the like, and can emit red light, green light, blue light, white light, or the like. In the embodiments of the present disclosure, the OLED type are not limited to the above. As shown in FIG. 2, an anode of the OLED may be coupled to the second electrode of the fourth transistor T4, and a cathode of the OLED may be coupled to the second voltage signal terminal VSS to receive the second voltage signal. FIG. 2 also schematically shows a capacitor Coled of the OLED, which may be in parallel with both ends of the OLED.

In the above embodiment, the data signal terminal may provide the data signal and the reference signal in different time periods. However, according to other embodiments of the present disclosure, the reference signal can also be provided separately in other ways without transmitting the reference signal via the data signal terminal. Therefore, the data signal terminal can only transmit the data signal, thus simplifying the design of the drive circuit. For details, reference can be made to the description of the following embodiments.

Figure 3:
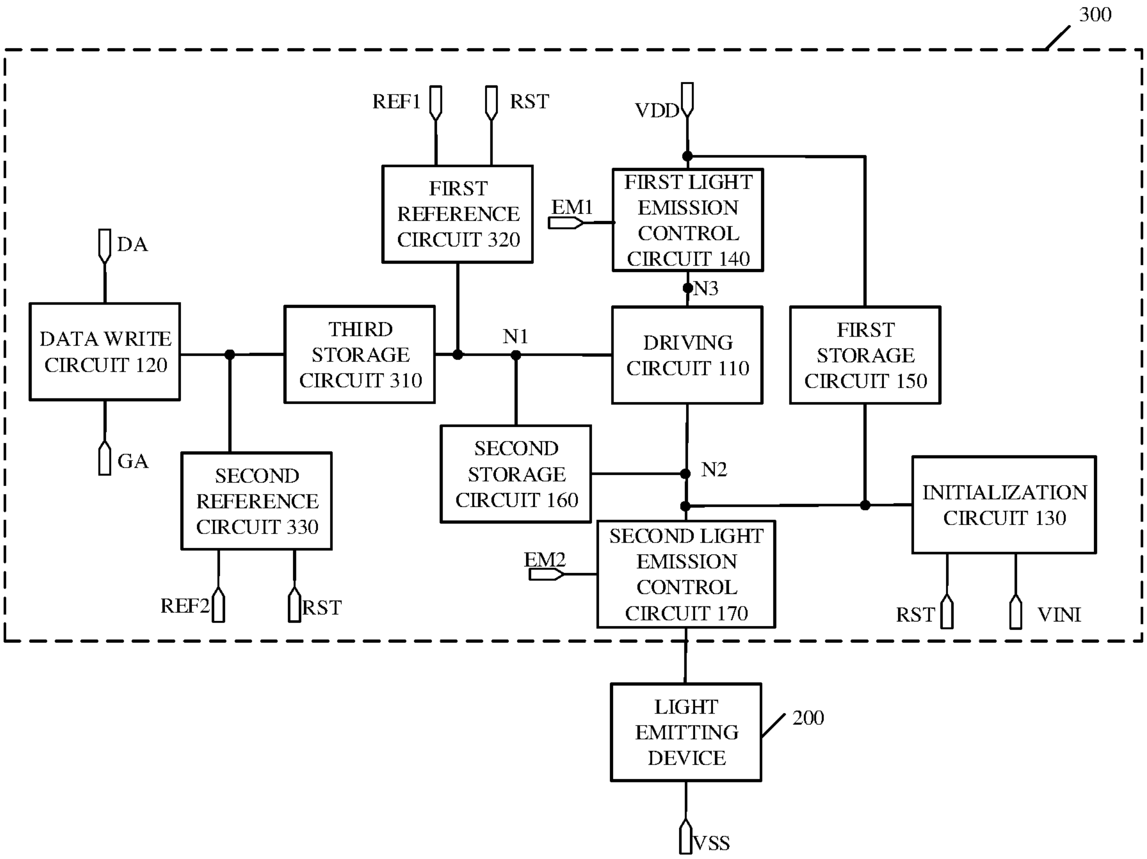
FIG. 3 shows a schematic block diagram of a pixel circuitry according to another embodiment of the present disclosure.

FIG. 3 shows a schematic block diagram of a pixel circuitry according to another embodiment of the present disclosure. As shown in FIG. 3, the pixel circuitry 300 may include a drive circuit 110, a data write circuit 120, an initialization circuit 130, a first light emission control circuit 140, a first storage circuit 150, a second storage circuit 160, a second light emission control circuit 170, a third storage circuit 310, a first reference circuit 320, and a second reference circuit 330. Except for the third storage circuit 310, the first reference circuit 320 and the second reference circuit 330, each element in the pixel circuitry in FIG. 3 may be similar to the corresponding element in the pixel circuitry in FIG. 1 in structure and function. Repeated descriptions may be omitted herein. In addition, structure and function of the light emitting device 200 in FIG. 3 may also be the same as those of the light emitting device 200 in FIG. 1.

As shown in FIG. 3, a third storage circuit 310 may be additionally provided between the drive circuit 110 and the data write circuit 120. For example, an end of the third storage circuit 310 may be coupled to the control end of the drive circuit 110 via the first node N1. The other end of the third storage circuit 310 may be coupled to the data write circuit 120 via the fourth node N4. In an embodiment, the data write circuit 120 can provide the data signal from the data signal terminal DA to the fourth node N4 according to the drive signal from the drive signal terminal GA. The third storage circuit 310 may store a voltage difference between the fourth node N4 and the first node N1.

The first reference circuit 320 may receive a reset signal via the reset signal terminal RST, and receive a first reference signal via the first reference signal terminal REF1. The first reference circuit 320) may also be coupled to the first node N1. In an embodiment, the first reference circuit 320) can provide the first reference signal from the first reference signal terminal REF1 to the first node N1, according to the reset signal from the reset signal terminal RST, to control a voltage of the first node N1.

The second reference circuit 330 may receive a reset signal via the reset signal terminal RST, and receive a second reference signal via the second reference signal terminal REF2. The second reference circuit 330 may also be coupled to the fourth node N4. In an embodiment, the second reference circuit 330 can provide the second reference signal from the second reference signal terminal REF2 to the fourth node N4, according to the reset signal from the reset signal terminal RST, to control a voltage of the fourth node N4.

In an embodiment, the first reference signal and the second reference signal may be same signals, such as same low voltage level signal. In another embodiment, the first reference signal and the second reference signal may also be different signals.

Figure 4:
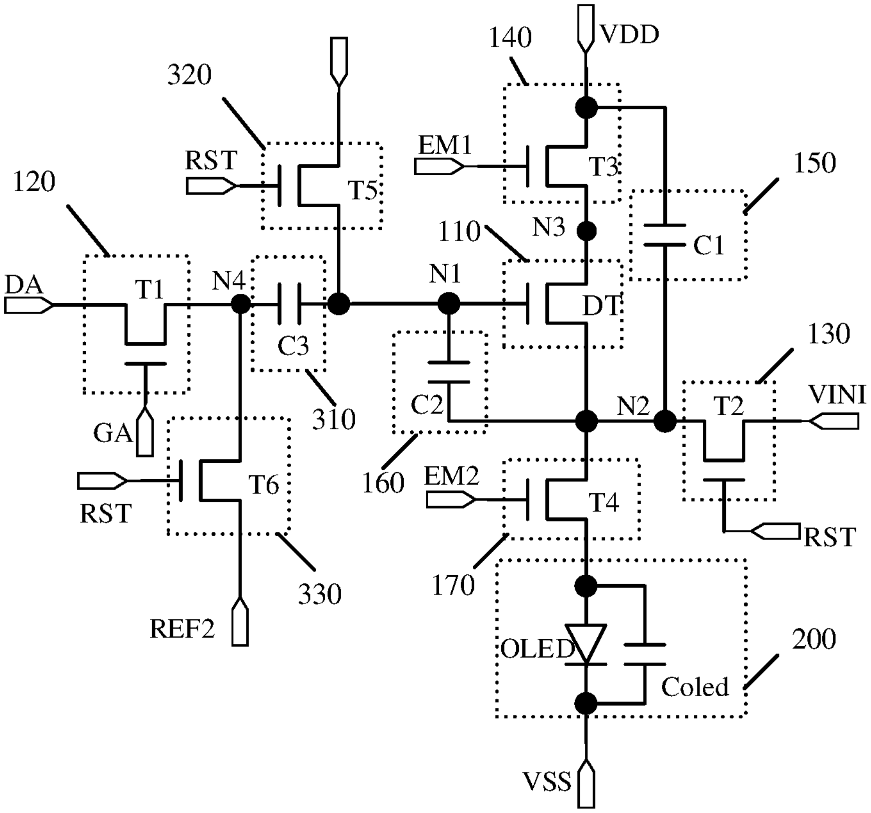
FIG. 4 shows an exemplary circuit diagram of a pixel circuitry according to another embodiment of the present disclosure.

FIG. 4 shows an exemplary circuit diagram of a pixel circuitry according to an embodiment of the present disclosure, in which, for example, the pixel circuitry may be the pixel circuitry in FIG. 3. As shown in FIG. 4, the pixel circuitry may include a drive transistor DT, a first transistor T1, a second transistor T2, a third transistor T3, a fourth transistor T4, a fifth transistor (for example, T1-T5 may be switching transistors), a first capacitor C1, a second capacitor C2, and a third capacitor C3. Except for the third capacitor C3, the fifth transistor T5 and the sixth transistor T6, each element in the pixel circuitry in FIG. 4 may be similar to the corresponding element in the pixel circuitry in FIG. 2 in structure and function. Thus, repeated descriptions may be omitted herein. Moreover, the structure and function of the light emitting device in FIG. 4 may be the same as the structure and function of the light emitting device in FIG. 2.

In an embodiment, the transistors adopted can be N-type transistor or P-type transistor. Specifically, the transistor can be an N-type or P-type field effect transistor (MOSFET), or an N-type or P-type bipolar transistor (BJT). In the embodiment of the present disclosure, a gate of the transistor can be referred to as a control electrode. As a source and a drain of a transistor are symmetrical, the source and drain may not be distinguished. That is, the source of a transistor can be a first electrode (or a second electrode), and the drain can be the second electrode (or the first electrode).

In embodiments of the present disclosure, the transistors may be described as N-type field effect transistors (NMOS) as an example. For example, the N-type transistor may be turned on in response to a high voltage level signal of the control electrode.

As shown in FIG. 4, the third storage circuit 310 may include a third capacitor C3. A first end of the third capacitor C3 may be coupled to the fourth node N4, and a second end of the third capacitor C3 may be coupled to the first node N1.

The first reference circuit 320 may include a fifth transistor T5. A control electrode of the fifth transistor T5 may be coupled to the reset signal terminal RST to receive the reset signal. A first electrode of the fifth transistor T5 may be coupled to the first reference signal terminal REF1 to receive the first reference signal REF1. A second electrode of the fifth transistor T5 may be coupled to the first node N1. In an example, the fifth transistor T5 may be an N-type transistor.

The second reference circuit 330 may include a sixth transistor T6. A control electrode of the sixth transistor T6 may be coupled to the reset signal terminal RST to receive the reset signal. A first electrode of the sixth transistor T6 may be coupled to the second reference signal terminal REF2 to receive the second reference signal REF2. A second electrode of the sixth transistor T6 may be coupled to the fourth node N4. In an example, the sixth transistor T6 may be an N-type transistor.

It is to be understood that, one or more of the third storage circuit 310, the first reference circuit 320, and the second reference circuit 330 may also be circuits with other elements, and are not limited to those described above.

Figure 5:
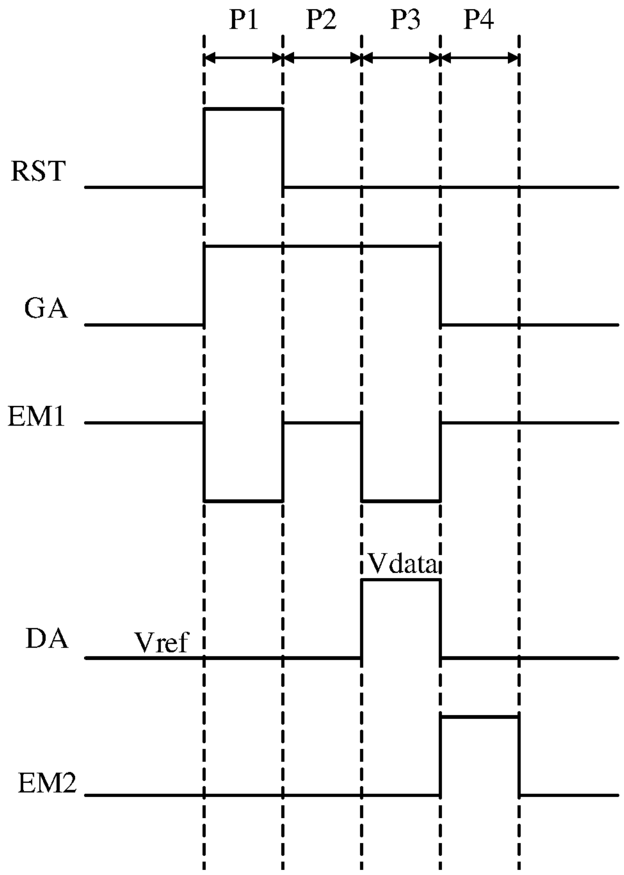
FIG. 5 shows a timing chart of signals in a pixel circuitry according to an embodiment of the present disclosure.

FIG. 5 shows a timing chart of signals for driving a pixel circuitry of an embodiment of the present disclosure. The pixel circuitry may be, for example, the pixel circuitry shown in FIG. 2. As shown in FIG. 5, the working process of the pixel circuitry may include four phases, such as, an initial phase P1, a compensation phase P2, a data write phase P3 and a light emission phase P4.

Figure 6A:
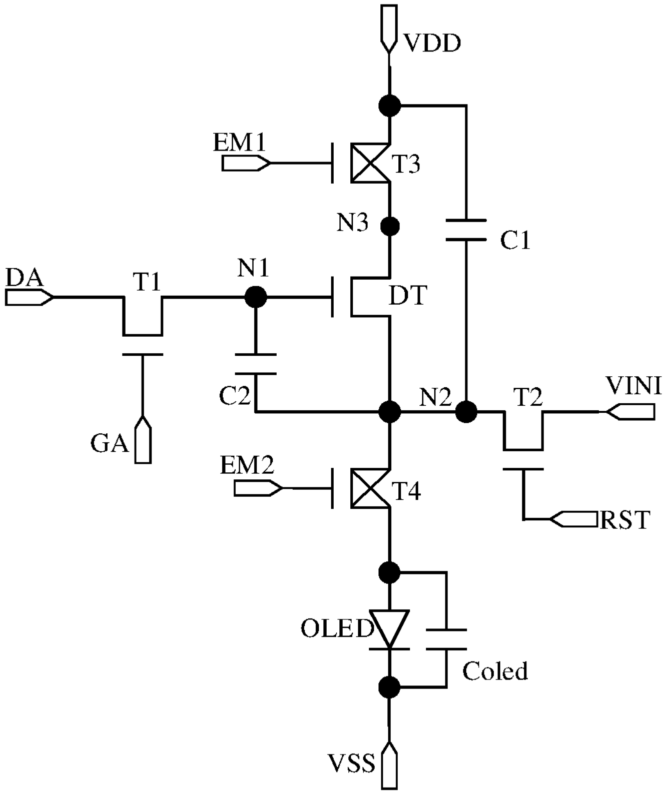
FIG. 6A is an equivalent circuit diagram of the pixel circuitry shown in FIG. 2 in an initialization phase.
Figure 6B:
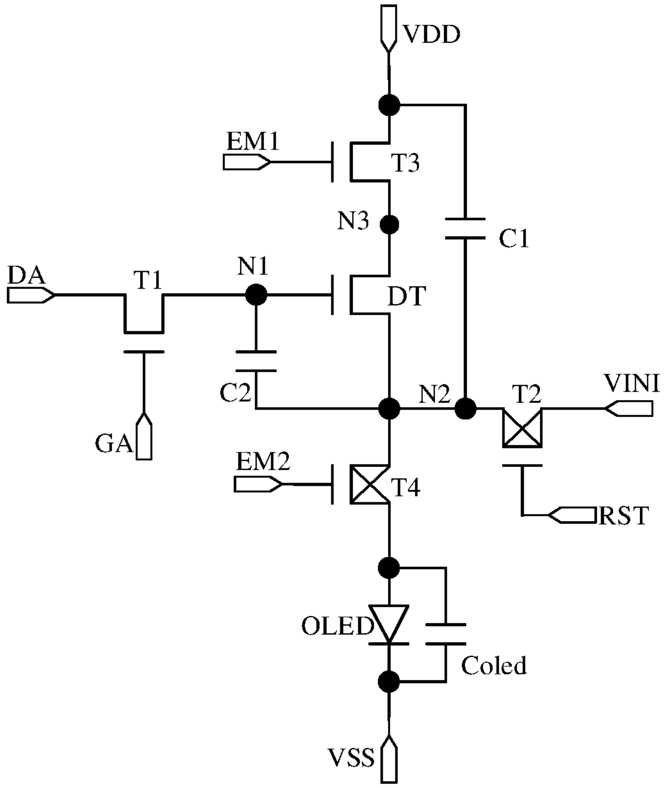
FIG. 6B is an equivalent circuit diagram of the pixel circuitry shown in FIG. 2 in a compensation phase.
Figure 6C:
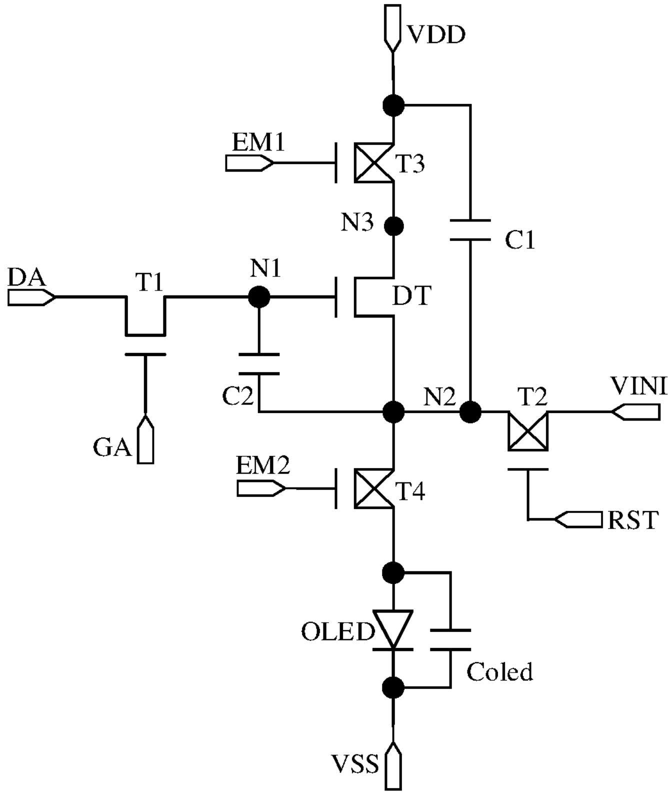
FIG. 6C is an equivalent circuit diagram of the pixel circuitry shown in FIG. 2 in a data write phase.
Figure 6D:
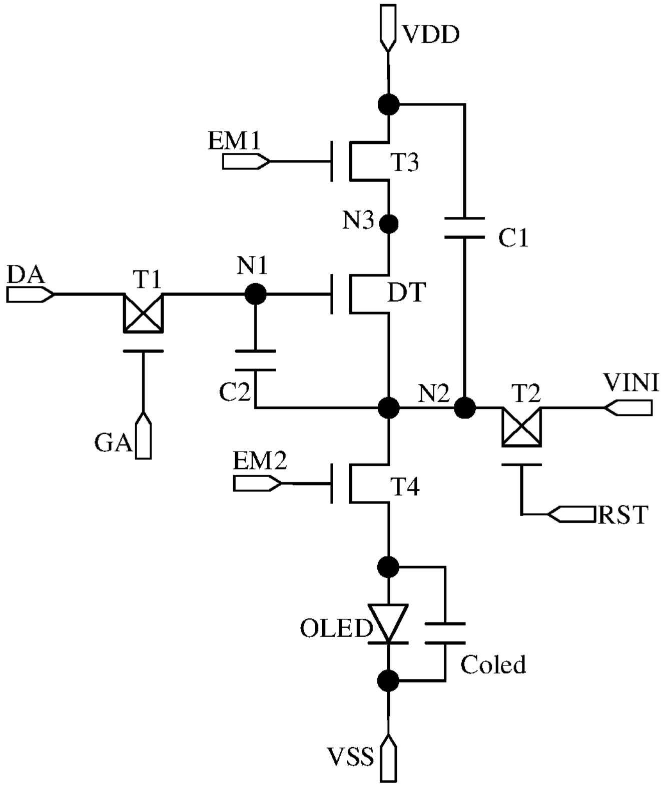
FIG. 6D is an equivalent circuit diagram of the pixel circuitry shown in FIG. 2 in a light emission phase.

FIG. 6A is an equivalent circuit diagram of the pixel circuitry shown in FIG. 2 at the initialization phase. FIG. 6B is an equivalent circuit diagram of the pixel circuitry shown in FIG. 2 in the compensation phase. FIG. 6C is an equivalent circuit diagram of the pixel circuitry shown in FIG. 2 in the data write phase. FIG. 6D is an equivalent circuit diagram of the pixel circuitry shown in FIG. 2 in the light emission phase.

In FIG. 5. FIG. 6A. FIG. 6B. FIG. 6C and FIG. 6D, symbols VDD. VSS and VIN1 may be used to represent both corresponding voltage signal terminal and the corresponding voltage. In an example, the first voltage signal terminal VDD may provide a high voltage level signal, the second voltage signal terminal VSS may provide a low voltage level signal, and the initialization signal terminal VIN1 may provide a low voltage level signal. In addition, symbols RST, GA, EM1 and EM2 may be used to represent both corresponding signal terminals and corresponding signals. A symbol Vref may represent both the reference signal at the data signal terminal DA and the corresponding voltage. A symbol Vdata may represent both the data signal at the data signal terminal DA and the corresponding voltage. Moreover, in FIG. 6A, FIG. 6B. FIG. 6C and FIG. 6D, the transistor identified with a symbol “x” indicates that the transistor is in a turned-off state in the corresponding phase.

Taking the first transistor T1, the second transistor T2, the third transistor T3, the fourth transistor T4 and the drive transistor DT being N-type transistors as an example, the following describes a working process of the pixel circuitry in FIG. 2 in combination with FIG. 5. FIG. 6A. FIG. 6B. FIG. 6C and FIG. 6D.

As shown in FIG. 5, in the initialization phase P1, the drive signal GA and the reset signal RST may be provided at a high voltage level. The first light emission control signal EM1 and the second light emission control signal EM2 may be provided at a low voltage level. The data signal terminal DA may provide a reference signal Vref, such as at a low voltage level.

As shown in FIG. 6A, in the initialization phase P1, the first transistor T1 can be turned on, under the control of the drive signal GA at the high voltage level, to provide the reference signal Vref from the data signal terminal DA to the first node N1. A voltage $V_{N1}$ of the first node N1 (that is, the control electrode of the drive transistor) can be initialized to the voltage Vref. The second transistor T2 can be turned on, under the control of the reset signal RST at the high voltage level, to provide the low voltage level initialization signal VIN1 to the second node N2. Thus, a voltage $V_{N2}$ of the second node N2 (that is, the first electrode of the drive transistor) can be initialized to the voltage VIN1.

Moreover, the third transistor T3 can be turned off, under the control of the first light emission control signal EM1 at the low voltage level, to separate the first voltage signal terminal VDD from the drive transistor DT. The fourth transistor T4 can be turned off, under the control of the second light emission control signal EM2 at the low voltage level, to separate the drive transistor DT from the OLED. Thus, the drive current $I_{DS}$ of the drive transistor DT could not be transferred to the OLED, avoiding the OLED from emitting light by mistake.

As shown in FIG. 5, in the compensation phase P2, the drive signal GA and the first light emission control signal EM1 may be provided at a high voltage level. The reset signal RST and the second light emission control signal EM2 may be provided at a low voltage level. The data signal terminal DA may provide the reference signal Vref, such as at a low voltage level.

As shown in FIG. 6B, in the compensation phase P2, the first transistor T1 can be turned on, under the control of the drive signal GA at the high voltage level, to provide the reference signal Vref from the data signal terminal DA to the first node N1. Therefore, the voltage $V_{N1}$ of the first node N1 can be maintained as Vref. The third transistor T3 can be turned on, under the control of the first light emission control signal EM1 at the high voltage level, to provide the first voltage signal VDD to the third node N3. In this case, the drive transistor DT can be turned on. The drive current $I_{DS}$ of the drive transistor DT can charge the second node N2, to increase the voltage $V_{N2}$ of the second node N2 until the voltage $V_{N2}$ reaches Vref-Vth. Vth is the threshold voltage of drive transistor DT. In addition, the first capacitor C1 can store the voltage difference between the first voltage signal terminal VDD and the second node N2. The second capacitor C2 can store the voltage difference between the first node N1 and the second node N2.

In addition, the fourth transistor T4 can be turned off, under the control of the second light emission control signal EM2 at low voltage level, to disconnect a path between the drive transistor DT and the OLED. Thus, the drive current $I_{DS}$ could not be transferred to the OLED, thus avoiding the OLED from emitting light by mistake. The second transistor T2 can be turned off, under the control of the reset signal RST at the low voltage level.

As shown in FIG. 5, in the data write phase P3, the drive signal GA may be provided at a high voltage level. The reset signal RST, the first light emission control signal EM1 and the second light emission control signal EM2 may be provided at a low voltage level. The data signal terminal DA may provide a data signal Vdata.

As shown in FIG. 6C, in the data write phase P3, the first transistor T1 can be turned on, under the control of the drive signal at the high voltage level, to provide the data signal Vdata from the data signal terminal to the first node N1. Thus, the voltage $V_{N1}$ of the first node N1 can be Vdata.

The second transistor T2 can be turned off, under the control of the reset signal RST at the low voltage level. The third transistor T3 can be turned off, under the control of the first light emission control signal EM1 at the low voltage level. The fourth transistor T4 can be turned off, under the control of the second light emission control signal EM2 at the low voltage level. In addition, the first capacitor C1 can store the voltage difference between the first voltage signal terminal VDD and the second node N2. The second capacitor C2 can store the voltage difference between the first node N1 and the second node N2. Therefore, as the voltage $V_{N1}$ of the first node N1 changes, the voltage $V_{N2}$ of the second node N2 may also change accordingly.

Based on the voltage dividing of the first capacitor C1 and the second capacitor C2, the voltage $V_{N2}$ of the second node N2 can be calculated as:

$$\mathrm{Vref}-Vth+(C2/(C2+C1))*(\mathrm{Vdata}-\mathrm{Vref}).$$

As the fourth transistor T4 disconnects the path between the drive transistor DT and the OLED, the drive current $I_{DS}$ could not be transferred to the OLED, thereby preventing the OLED from emitting light by mistake. Meanwhile, it can also avoid the effect of the capacitance of OLED itself on the drive current $I_{DS}$.

As shown in FIG. 5, in the light emission phase P4, the first light emission control signal and the second light emission control signal may be provided at a high voltage level. The drive signal GA and the reset signal RST may be provided at a low voltage level.

As shown in FIG. 6D, in the light emission phase P4, the third transistor T3 can be turned on, under the control of the first light emission control signal EM1 at the high voltage level, to connect the first voltage signal terminal VDD with the drive transistor DT. The fourth transistor T4 can be turned on, under the control of the second light emission control signal EM2 at the high voltage level, to connect the drive transistor DT with the OLED.

In addition, the first transistor T1 can be turned off, under the control of the drive signal GA at the low voltage level. The second transistor T2 can be turned off, under the control of the reset signal RST at the low voltage level. The first capacitor C1 can maintain the voltage difference between the first voltage signal terminal VDD and the second node N2. The second capacitor C2 can maintain the voltage difference between the first node N1 and the second node N2. Therefore, the voltages of the first node N1 and the second node N2 can be the same as those in the previous phase.

At this phase, the drive current $I_{DS}$ of the drive transistor DT can be provided to the OLED such that the OLED can emit light. The drive current $I_{DS}$ can be calculated according to the following equations:

$$I_{DS}=\frac{1}{2}\mu C_{ox}\frac{W}{L}(V_{gs}-V_{th})^2$$

$$V_{gs}=V_{N1}-V_{N2}=V_{data}-\left(V_{ref}-V_{th}+(V_{data}-V_{ref})\frac{C_2}{C_1+C_2}\right)$$

$$V_{gs}=V_{th}+(V_{data}-V_{ref})\frac{C_1}{C_1+C_2}$$

$$I_{DS}=\frac{1}{2}\mu C_{ox}\frac{W}{L}(V_{gs}-V_{th})^2=\frac{1}{2}\mu C_{ox}\frac{W}{L}\left(\frac{C_1}{C_1+C_2}\right)^2(V_{data}-V_{ref})^2.$$

In the above equations, μ, $C_{ox}$, W, and L are constant values related to the drive transistor DT, where μ is an electron mobility of the drive transistor DT, $C_{ox}$ is an oxide capacitance per unit area of the drive transistor DT, W is a channel width of the drive transistor DT, and L is a channel length of the drive transistor DT. Vgs may represent a voltage between the gate (or control electrode) and the source (or first electrode) of the drive transistor DT. Vth may represent the threshold voltage of the drive transistor DT.

From the above equations, the drive current flowing through the light emitting device OLED may no longer be related to the threshold voltage of the drive transistor DT, the power supply voltage (for example, the first voltage VDD, the second voltage VSS), or the capacitance Coled of the light emitting device itself. Thus, the compensation of the pixel circuitry can be realized. The problem of the drift of the threshold voltage caused by the manufacturing process and long-time working process of the drive transistor DT can be solved. The problem of different power supply voltages provided to each pixel circuitry due to different positions of each pixel unit can be solved. The problem of different capacitance Coled of each light emitting device can be solved, thereby eliminating the impact on the drive current. Therefore, the display effect of the display device with the pixel circuitry can be improved.

Figure 7:
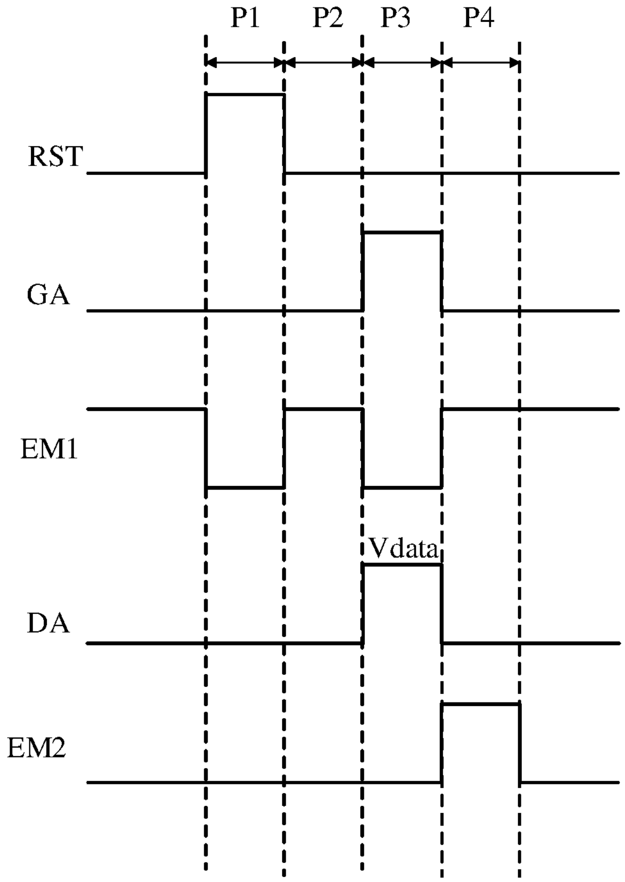
FIG. 7 shows a timing chart of signals in a pixel circuitry according to another embodiment of the present disclosure.

FIG. 7 shows a timing chart of signals for driving a pixel circuitry of an embodiment of the present disclosure. The pixel circuitry is, for example, the pixel circuitry shown in FIG. 4. As shown in FIG. 7, the working process of the pixel circuitry may include four phases, such as, an initial phase P1, a compensation phase P2, a data write phase P3 and a light emission phase P4.

Figure 8A:
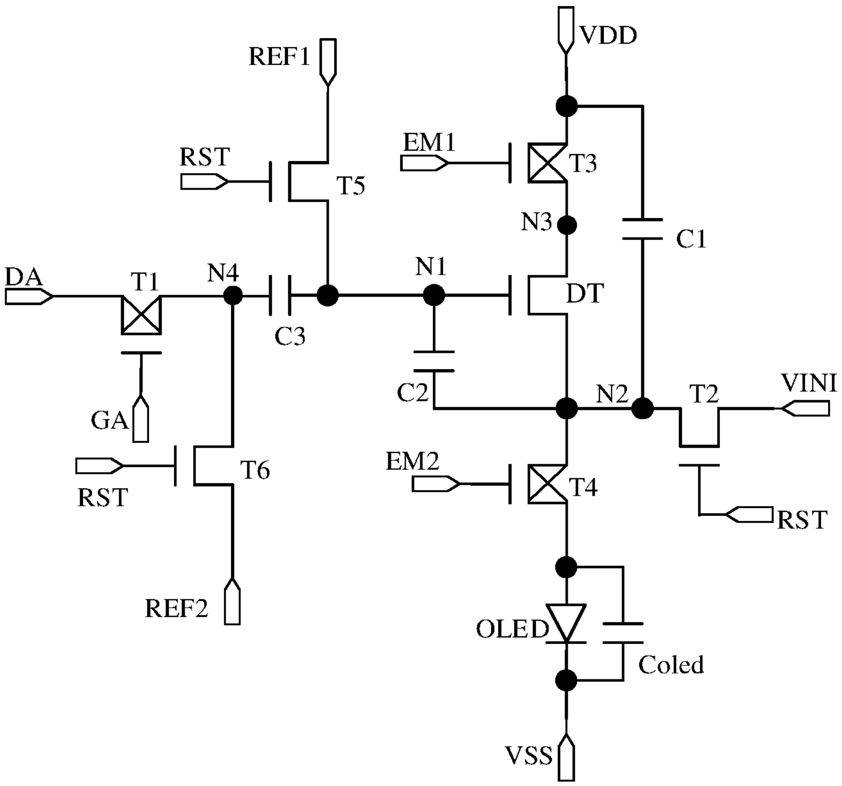
FIG. 8A is an equivalent circuit diagram of the pixel circuitry shown in FIG. 4 in an initialization phase.
Figure 8B:
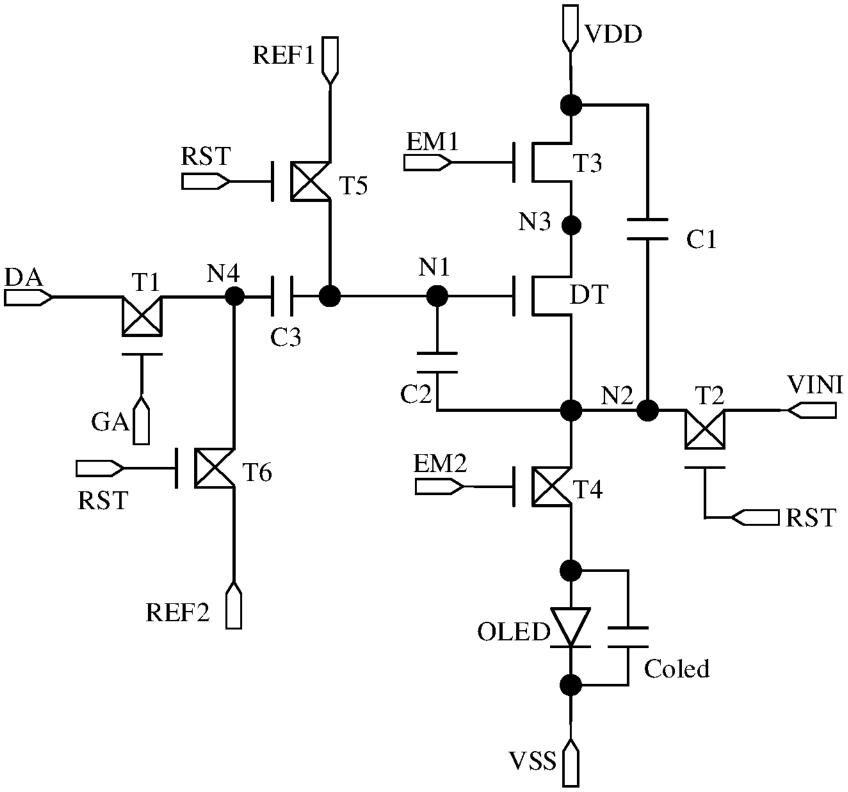
FIG. 8B is an equivalent circuit diagram of the pixel circuitry shown in FIG. 4 in a compensation phase.
Figure 8C:
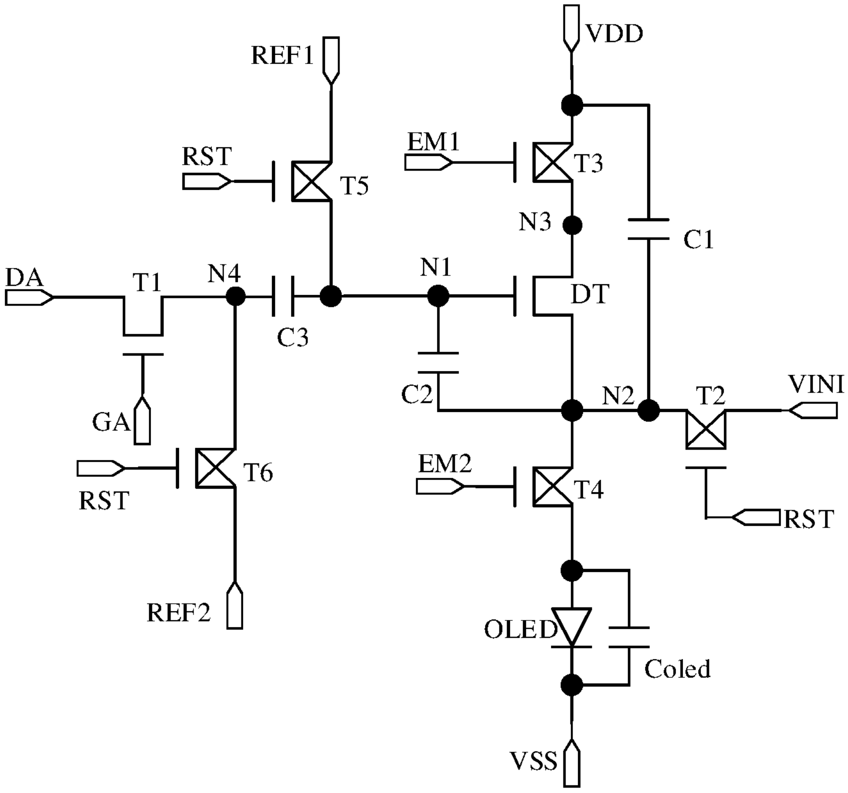
FIG. 8C is an equivalent circuit diagram of the pixel circuitry shown in FIG. 4 in a data write phase.
Figure 8D:
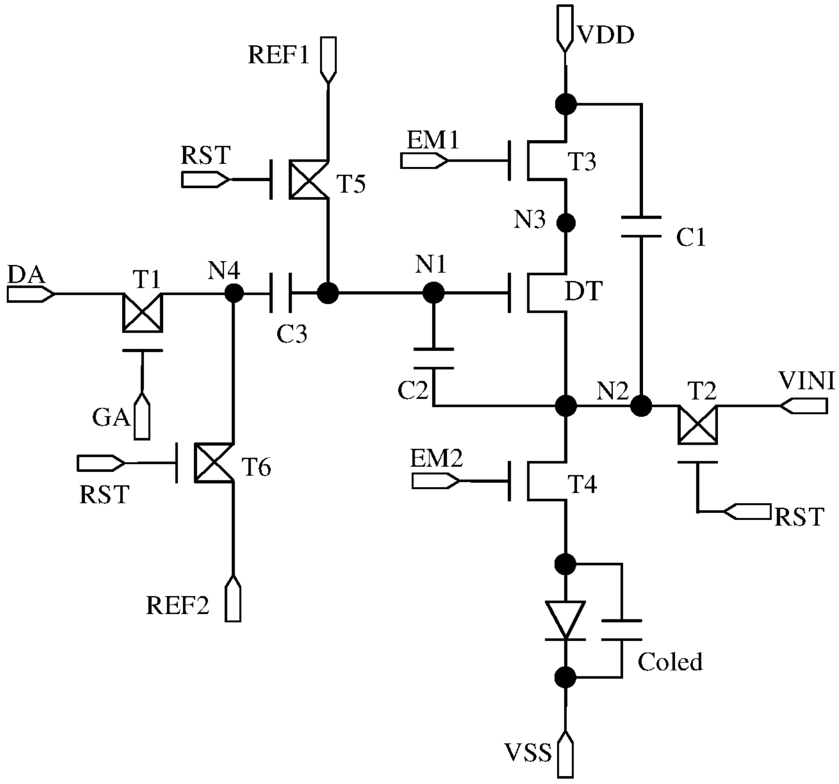
FIG. 8D is an equivalent circuit diagram of the pixel circuitry shown in FIG. 4 in a light emission phase.

FIG. 8A is an equivalent circuit diagram of the pixel circuitry shown in FIG. 4 in the initialization phase. FIG. 8B is an equivalent circuit diagram of the pixel circuitry shown in FIG. 4 in the compensation phase. FIG. 8C is an equivalent circuit diagram of the pixel circuitry shown in FIG. 4 in the data write phase. FIG. 8D is an equivalent circuit diagram of the pixel circuitry shown in FIG. 4 in the light emission phase.

In FIG. 7. FIG. 8A. FIG. 8B. FIG. 8C and FIG. 8D, the symbols VDD. VSS and VIN1 may be used to represent both the corresponding voltage signal terminal and the corresponding voltage. In an example, the first voltage signal terminal VDD may provide a high voltage level signal, the second voltage signal terminal VSS may provide a low voltage level signal, and the initialization signal terminal VIN1 may provide a low voltage level signal. In addition, symbols RST, GA, EM1 and EM2 may be used to represent both corresponding signal terminals and corresponding signals. A symbol Vdata may represent both a data signal at the data signal terminal DA and the corresponding voltage. In addition, in the following description, for example, a symbol Vref1 may represent both a first reference signal at the first reference signal terminal REF1 and the corresponding voltage. A symbol Vref2 may represent a second reference signal at the second reference signal terminal REF2 and the corresponding voltage.

Moreover, the transistor identified with "x" indicates that the transistor is in a turned-off state in the corresponding phase.

Taking the first transistor T1, the second transistor T2, the third transistor T3, the fourth transistor T4, the fifth transistor T5, the sixth transistor T6 and the drive transistor DT being N-type transistors as an example, the working process of the pixel circuitry in FIG. 4 can be described in combination with FIG. 7. FIG. 8A. FIG. 8B. FIG. 8C and FIG. 8D.

As shown in FIG. 7, in the initialization phase P1, the reset signal RST may be provided at a high voltage level. The drive signal GA, the first light emission control signal EM1, and the second light emission control signal EM2 may be provided at a low voltage level. In addition, while FIG. 7 shows the signal at the data signal terminal DA as an example, it can be understood that the data signal terminal can provide a data signal or any appropriate signal, which is not limited. Embodiments will be described below.

As shown in FIG. 8A, in the initialization phase P1, the second transistor T2, the fifth transistor T5 and the sixth transistor T6 can be respectively turned on, under the control of the reset signal RST at the high voltage level, to provide the initialization signal Vini at the low voltage level to the second node N2, provide the first reference signal Vref1 to the first node N1, and provide the second reference signal Vref2 to the fourth node N4. Thus, a voltage $V_{N1}$ of the first node N1 (i.e., the control electrode of the drive transistor) can be initialized as the voltage Vref1. A voltage $V_{N2}$ of the second node N2 (i.e., the first electrode of the drive transistor) can be initialized as the voltage VIN1. A voltage $V_{N4}$ of the fourth node N4 can be initialized as the voltage Vref2.

Moreover, the first transistor T1 can be turned off under the control of the drive signal GA at the low voltage level, thus separating the data signal terminal DA from the fourth node N4. As the signal at the data signal terminal DA is not be transmitted to the fourth node N4, there is no need to limit the signal at the data signal terminal DA. That is, the data signal terminal DA may not need to transmit a reference signal, which can be a data signal or any other signal.

In addition, the third transistor T3 can be turned off, under the control of the first light emission control signal EM1 at the low voltage level to separate the first voltage signal terminal VDD from the drive transistor DT. The fourth transistor T4 can be turned off, under the control of the second light emission control signal EM2 at the low voltage level, to separate the drive transistor DT from the OLED. Thus, the drive current $I_{DS}$ of the drive transistor DT could not be transferred to the OLED, avoiding the OLED from emitting light by mistake.

As shown in FIG. 7, in the compensation phase P2, the first light emission control signal EM1 may be provided at a high voltage level. The drive signal GA, the reset signal RST, and the second light emission control signal EM2 may be provided at a low voltage level. Similar with that in the initial phase, the data signal terminal DA can provide data signal or any signal, which is not limited herein.

As shown in FIG. 8B, in the compensation phase P2, the first transistor T1 can be turned off, under the control of the drive signal GA at the low voltage level, such that the signal at the data signal terminal DA is not transmitted to the fourth node N4. Thus, the signal at the data signal terminal DA can be the data signal or any signal. The fifth transistor T5 and the sixth transistor T6 can be turned off, under the control of the reset signal RST at the low voltage level. As the third capacitor can store the voltage difference between the fourth node N4 and the first node N1, the first node N1 and the fourth node N4 can respectively maintain the corresponding voltage in the previous phase. That is, the voltage $V_{N1}$ of the first node N1 is Vref1, and the voltage $V_{N4}$ of the fourth node N4 is Vref2.

The third transistor T3 can be turned on, under the control of the first light emission control signal EM1 at the high voltage level, to provide the first voltage signal VDD to the third node N3. The first capacitor C1 can store the voltage difference between the first voltage signal terminal VDD and the second node N2. The second capacitor C2 can store the voltage difference between the first node N1 and the second node N2. At this phase, the drive transistor DT can be turned on. The drive current $I_{DS}$ of the drive transistor DT can charge the second node N2 to increase the voltage $V_{N2}$ of the second node N2 until the voltage $V_{N2}$ reaches Vref1-Vth. Vth is the threshold voltage of drive transistor DT.

The fourth transistor T4 can be turned off, under the control of the second light emission control signal EM2 at the low voltage level, to disconnect a path between the drive transistor DT and the light emitting device 200. The drive current $I_{DS}$ may not be transferred to the OLED, avoiding the OLED from emitting light by mistake. In addition, the second transistor T2 can be turned off, under the control of the reset signal RST at the low voltage level.

As shown in FIG. 7, in the data write phase P3, the drive signal GA may be provided at a high voltage level. The reset signal RST, a first light emission control signal EM1 and a second light emission control signal EM2 may be provided at a low voltage level. The data signal terminal DA may provide a data signal Vdata.

As shown in FIG. 8C, in the data write phase P3, the first transistor T1 can be turned on, under the control of the drive signal GA at the high voltage level, to provide the data signal Vdata from the data signal terminal DA to the fourth node N4, such that the voltage $V_{N4}$ of the fourth node N4 can be Vdata.

The first capacitor C1 can store the voltage difference between the first voltage signal terminal VDD and the second node N2. The second capacitor C2 can store the voltage difference between the first node N1 and the second node N2, and the third capacitor can store the voltage difference between the fourth node N4 and the first node N1. Therefore, as the voltage VN4 of the fourth node N4 changes, the voltage VN1 of the first node N1 and the voltage VN2 of the second node N2 can also change accordingly.

According to the voltage dividing of the third capacitor C3, the second capacitor C2 and the first capacitor C1, the voltages of the first node N1 and the second node N2 can be calculated as:

$$V_{N1} = (V_{data} - V_{ref2})\frac{(C_3 * C_2 + C_3 * C_1)}{(C_3 * C_2 + C_1 * C_2 + C_3 * C_1)} + V_{ref1}$$

$$V_{N2} = (V_{data} - V_{ref2})\frac{(C_3 * C_2)}{(C_3 * C_2 + C_1 * C_2 + C_3 * C_1)} + V_{ref1} - V_{th}.$$

As the fourth transistor T4 disconnects the path between the drive transistor DT and the OLED, the drive current $I_{DS}$ may not be transferred to the OLED, preventing the OLED from emitting light by mistake. Meanwhile, it can also avoid the effect of the capacitance of OLED itself on the drive current $I_{DS}$.

As shown in FIG. 7, in the light emission phase P4, the first light emission control signal EM1 and the second light emission control signal EM2 may be provided at a high voltage level. The drive signal GA and a reset signal RST can be provided at a low voltage level. As above, the data signal terminal DA can provide data signal or any signal, which is not limited herein.

As shown in FIG. 8D, in the light emission phase P4, the third transistor T3 can be turned on, under the control of the first light emission control signal EM1 at the high voltage level, to connect the first voltage signal terminal VDD with the drive transistor DT. The fourth transistor T4 can be turned on, under the control of the second light emission control signal EM2 at the high voltage level, to connect the drive transistor DT with the OLED.

Moreover, the first transistor T1 can be turned off, under the control of the drive signal GA at the low voltage level. The second transistor T2, the fifth transistor T5, and the sixth transistor T6 can be turned off, under the control of the reset signal RST at the low voltage level. The first capacitor C1 can maintain the voltage difference between the first voltage signal terminal VDD and the second node N2. The second capacitor C2 can maintain the voltage difference between the first node N1 and the second node N2. The third capacitor can store the voltage difference between the fourth node N4 and the first node N1. Therefore, the voltage $V_{N1}$ of the first node N1, the voltage $V_{N2}$ of the second node N2, and the voltage $V_{N4}$ of the fourth node N4 can be stored via the capacitors, and can be the same as those in the previous phase.

At this phase, the drive current $I_{DS}$ of the drive transistor DT can be provided to the OLED, such that the OLED can emit light. The drive current $I_{DS}$ can be calculated according to the following equations:

$$V_{gs} = V_{N1} - V_{N2} = (V_{data} - V_{ref2})\frac{(C_3 * C_2 + C_3 * C_1)}{(C_3 * C_2 + C_1 * C_2 + C_3 * C_1)} + V_{ref1} - (V_{data} - V_{ref2})\frac{(C_3 * C_2)}{(C_3 * C_2 + C_1 * C_2 + C_3 * C_1)} - V_{ref1} + V_{th}$$

$$V_{gs} = (V_{data} - V_{ref2})\frac{(C_3 * C_1)}{(C_3 * C_2 + C_1 * C_2 + C_3 * C_1)} + V_{th}$$

-continued $$I_{DS} = \frac{1}{2}\mu C_{ox}\frac{W}{L}(V_{gs} - V_{th})^2 = \frac{1}{2}\mu C_{ox}\frac{W}{L}\left(\frac{C_3 * C_1}{C_3 * C_2 + C_1 * C_2 + C_3 * C_1}\right)^2 (V_{data} - V_{ref2})^2$$

In the above equations, μ, $C_{ox}$, W, and L are constant values related to the drive transistor DT, where μ is an electron mobility of the drive transistor DT, $C_{ox}$ is an oxide capacitance per unit area of the drive transistor DT, W is a channel width of the drive transistor DT, and L is a channel length of the drive transistor DT. Vgs may represent a voltage between the gate (or control electrode) and the source (or first electrode) of the drive transistor DT. Vth may represent the threshold voltage of the drive transistor DT.

From the above equations, the drive current flowing through the light emitting device OLED may no longer be related to the threshold voltage of the drive transistor DT, the power supply voltage (for example, the first voltage VDD, the second voltage VSS), or the capacitance Coled of the light emitting device itself. Thus, the compensation of the pixel circuitry can be realized. The problem of the drift of the threshold voltage caused by the manufacturing process and long-time working process of the drive transistor DT can be solved. The problem of different power supply voltages provided to each pixel circuitry due to different positions of each pixel unit can be solved. The problem of different capacitance Coled of each light emitting device can be solved, thereby eliminating the impact on the drive current. Therefore, the display effect of the display device with the pixel circuitry can be improved.

In addition, by providing the first reference signal and the second reference signal individually, the data signal terminal can only transmit the data signal but not transmitting other reference signal, thereby simplifying the design of the drive circuit.

Further, in an example, the first reference signal Vref1 and the second reference signal Vref2 may be the same signal. In other examples, the first reference signal Vref1 and the second reference signal Vref2 may also be different signals.

Figure 9:
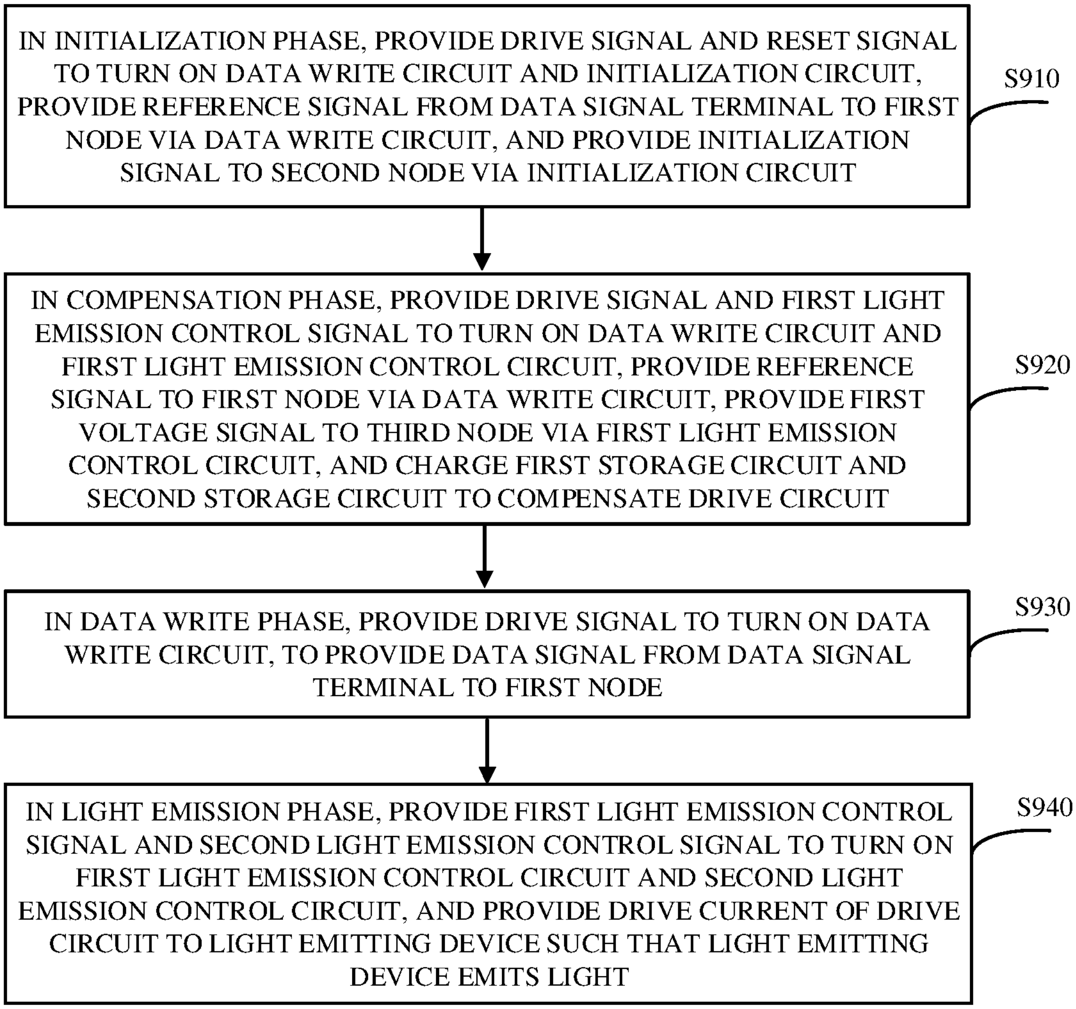
FIG. 9 shows a flowchart of a method for driving a pixel circuitry according to an embodiment of the present disclosure.

FIG. 9 shows a schematic flowchart of a method for driving a pixel circuitry according to an embodiment of the present invention. The pixel circuitry may be, for example, the pixel circuitry shown in FIG. 1, and may adopt the circuit structure of the pixel circuitry shown in FIG. 2, for example.

In the method, in step S910, in the initialization phase, the drive signal and the reset signal can be provided to turn on the data write circuit and the initialization circuit. The reference signal from the data signal terminal can be provided to the first node via the data write circuit. The initialization signal can be provided to the second node via the initialization circuit.

In step S920, in the compensation phase, the drive signal and the first light emission control signal can be provided to turn on the data write circuit and the first light emission control circuit. The reference signal can be provided to the first node via the data write circuit. The first voltage signal can be provided to the third node via the first light emission control circuit. The first storage circuit and the second storage circuit can be charged to compensate the drive circuit.

Then, in step S930, in the data write phase, the drive signal can be provided to turn on the data write circuit, to provide the data signal from the data signal terminal to the first node.

In step S940, in the light emission phase, the first light emission control signal and the second light emission control signal can be provided, to turn on the first light emission control circuit and the second light emission control circuit. The drive current of the drive circuit can be provided to the light emitting device, such that the light emitting device can emit light.

In embodiments of the present disclosure, the driving method shown in FIG. 9 can be implemented with the timing chart of the signals in the pixel circuitry shown in FIG. 5 and the above related description.

Those skilled in the art can understand that, while the order of the method of driving the pixel circuitry is represented by steps S910, S920, S930 and S940 in the embodiment of the present disclosure, embodiments of the present disclosure may not be limited herein. Any suitable order of execution can be included within the scope of the disclosure.

Figure 10:
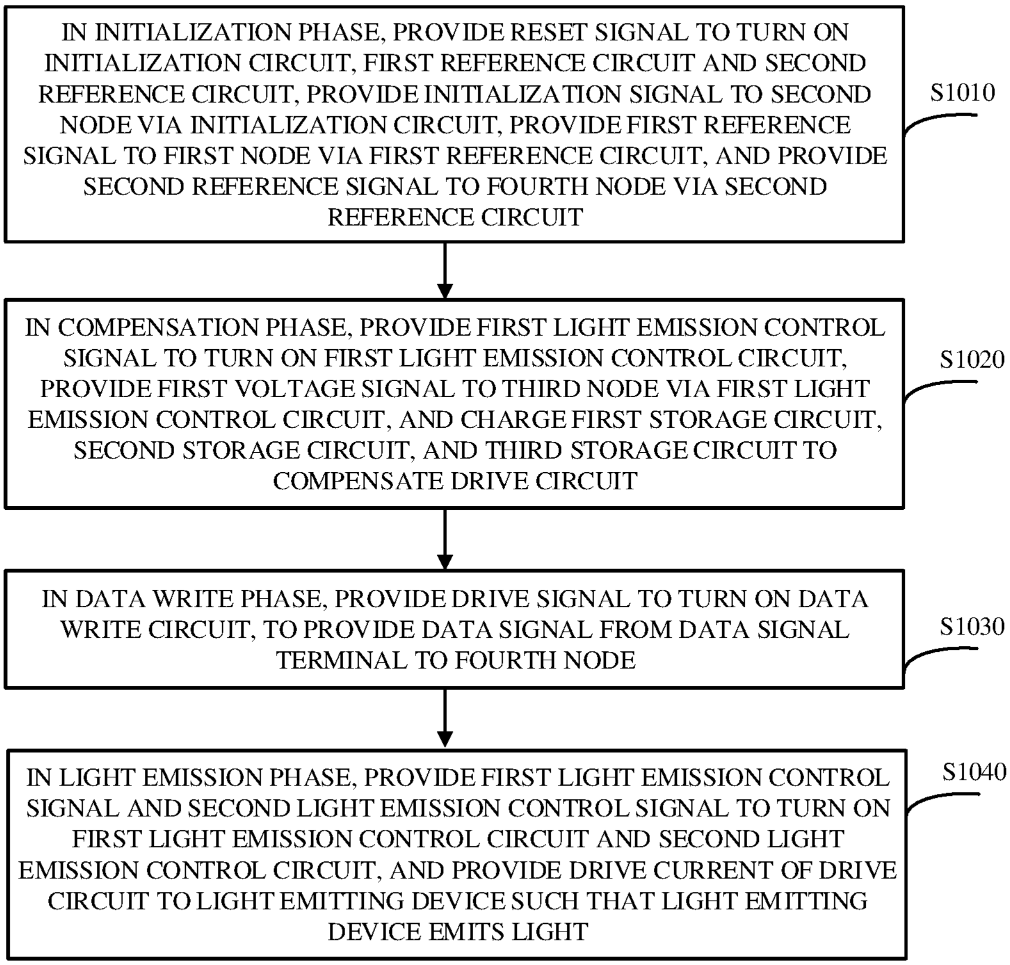
FIG. 10 shows a flowchart of a method for driving a pixel circuitry according to another embodiment of the present disclosure.

FIG. 10 shows a schematic flowchart of a method for driving a pixel circuitry according to an embodiment of the present invention. The pixel circuitry may be, for example, the pixel circuitry shown in FIG. 3, and may adopt the circuit structure of the pixel circuitry shown in FIG. 4, for example.

In the method, in step S1010, in the initialization phase, the reset signal can be provided to turn on the initialization circuit, the first reference circuit and the second reference circuit. The initialization signal can be provided to the second node via the initialization circuit. The first reference signal can be provided to the first node via the first reference circuit. The second reference signal can be provided to the fourth node via the second reference circuit.

In step S1020, in the compensation phase, the first light emission control signal can be provided to turn on the first light emission control circuit. The first voltage signal can be provided to the third node via the first light emission control circuit. The first storage circuit, the second storage circuit, and the third storage circuit can be charged to compensate the drive circuit.

In step S1030, in the data write phase, the drive signal can be provided to turn on the data write circuit, to provide the data signal from the data signal terminal to the fourth node.

In step S1040, in the light emission phase, the first light emission control signal and the second light emission control signal can be provided to turn on the first light emission control circuit and the second light emission control circuit. The drive current of the drive circuit can be provided to the light emitting device, such that the light emitting device can emit light.

In the embodiment of the present disclosure, the driving method shown in FIG. 10 can be implemented with the timing chart of the signals in the pixel circuitry shown in FIG. 7 and the above related description.

Those skilled in the art can understand that while the order of the method of driving the pixel circuitry is represented by steps S1010, S1020, S1030 and S1040 in the embodiment of the present disclosure, embodiments of the present disclosure may not be limited herein. Any suitable order of execution can be included within the scope of the disclosure.

Figure 11:
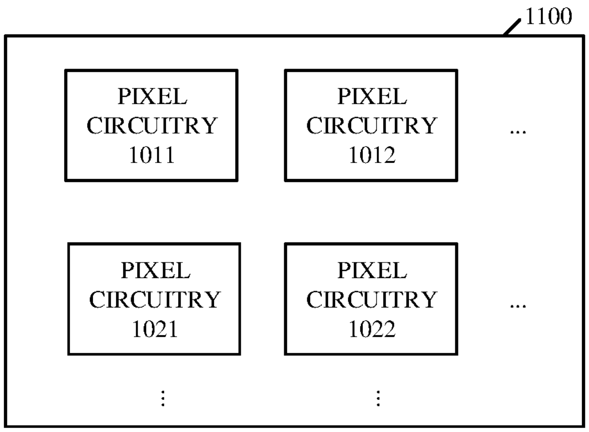
FIG. 11 shows a schematic diagram of an array substrate according to an embodiment of the present disclosure.

FIG. 11 shows a schematic diagram of an array substrate according to an embodiment of the present disclosure. The array substrate 1100 may include a plurality of pixel circuitries, for example, the pixel circuitry according to an embodiment of the present disclosure. As shown in FIG. 11, the plurality of pixel circuitries (e, g., pixel circuitries 1011, 1012, 1021, 1022, etc.) may be set in a matrix form.

On the other hand, embodiments of the present disclosure may also provide a display panel including the above array substrate. Embodiments of the present disclosure may also provide a display device including the display panel. The display device may be, for example, a display screen, a mobile phone, a tablet computer, a camera, a wearable device, and the like.

According to the embodiment of the present disclosure, it can compensate for the deviation and drift of the threshold voltage of the drive transistor in the plurality of pixel circuitries, as well as the brightness difference between the far end and the near end of the power supply caused by IR drop, thereby avoiding the effect of the capacitance of the light emitting device itself Coled on the drive current. The brightness uniformity and the display quality of the display can be improved. Moreover, based on the embodiments of the present disclosure, it can also prevent the light emission element from emitting light by mistake in the non-luminous phase.

In some embodiments, the data signal terminal may only transmit the data signal but not transmitting other reference signal, thus simplifying the design of the drive circuit.

A plurality of embodiments of the present disclosure are described in detail above. However, the scope of protection of the present disclosure is not limited thereto. Apparently, those of ordinary skill in the art may make various modifications, substitutions, and variations on some embodiments of the present disclosure without departing from the spirit and scope of the present disclosure. The scope of protection of the present disclosure is limited by the appended claims.

What is claimed is:

1. A method for driving a pixel circuitry, wherein the pixel circuitry comprises a drive circuit, a data write circuit, an initialization circuit, a first light emission control circuit, a first storage circuit, a second storage circuit and a second light emission control circuit, wherein the drive circuit is coupled to a first node, a second node and a third node, and is configured to provide a drive current to a light emitting device;

wherein the data write circuit is coupled to the first node, and is configured to provide a data signal from a data signal terminal to the drive circuit according to a drive signal from a drive signal terminal;

wherein the initialization circuit is configured to provide an initialization signal from an initialization signal terminal to the second node according to a reset signal from a reset signal terminal;

wherein the first light emission control circuit is configured to provide a first voltage signal from a first voltage signal terminal to the third node according to a first light emission control signal from a first light emission control signal terminal;

wherein the first storage circuit is configured to store a voltage difference between the first voltage signal terminal and the second node;

wherein the second storage circuit is configured to store a voltage difference between the first node and the second node;

wherein the second light emission control circuit is configured to control to provide the drive current to the light emitting device according to a second light emission control signal from a second light emission control signal terminal;

wherein the method comprises:

in an initialization phase, providing the drive signal and the reset signal to turn on the data write circuit and the initialization circuit, providing a reference signal from the data signal terminal to the first node via the data write circuit, and providing the initialization signal to the second node via the initialization circuit;

in a compensation phase, providing the drive signal and the first light emission control signal to turn on the data write circuit and the first light emission control circuit, providing the reference signal to the first node via the data write circuit, providing the first voltage signal to the third node via the first light emission control circuit, and charging the first storage circuit and the second storage circuit to compensate the drive circuit;

in a data write phase, providing the drive signal to turn on the data write circuit, to provide a data signal from the data signal terminal to the first node; and in a light emission phase, providing the first light emission control signal and the second light emission control signal to turn on the first light emission control circuit and the second light emission control circuit, and providing a drive current of the drive circuit to the light emitting device such that the light emitting device emits light.

2. The method circuitry according to claim 1, wherein the first storage circuit comprises:

a first capacitor, coupled between the first voltage signal terminal and the second node;

wherein the second storage circuit comprises:

a second capacitor, coupled between the first node and the second node.

3. The method according to claim 1, wherein the data write circuit comprises:

a first transistor, wherein a control electrode of the first transistor is coupled to the drive signal terminal, a first electrode of the first transistor is coupled to the data signal terminal, and a second electrode of the first transistor is coupled to the first node.

4. The method according to claim 1, wherein the initialization circuit comprises:

a second transistor, wherein a control electrode of the second transistor is coupled to the reset signal terminal, a first electrode of the second transistor is coupled to the initialization signal terminal, and a second electrode of the second transistor is coupled to the second node.

5. The method according to claim 1, wherein the first light emission control circuit comprises:

a third transistor, wherein a control electrode of the third transistor is coupled to the first light emission control signal terminal, a first electrode of the third transistor is coupled to the first voltage signal terminal, and a second electrode of the third transistor is coupled to the third node.

6. The method according to claim 1, wherein the second light emission control circuit comprises:

a fourth transistor, wherein a control electrode of the fourth transistor is coupled to the second light emission control signal terminal, a first electrode of the fourth transistor is coupled to the second node, and a second electrode of the fourth transistor is coupled to the light emitting device.

7. The method according to claim 1, wherein the drive circuit comprises:

a drive transistor, wherein a control electrode of the drive transistor is coupled to the first node, a first electrode of the drive transistor is coupled to the second node, and a second electrode of the drive transistor is coupled to the third node.

8. The method according to claim 1, wherein the data write circuit is further configured to provide a reference signal from the data signal terminal to the drive circuit according to the drive signal.

9. A method for driving a pixel circuitry, wherein the pixel circuitry comprises a drive circuit, a data write circuit, an initialization circuit, a first light emission control circuit, a first storage circuit, a second storage circuit, a second light emission control circuit, a third storage circuit, a first reference circuit and a second reference circuit, wherein the drive circuit is coupled to a first node, a second node and a third node, and is configured to provide a drive current to a light emitting device;

wherein the data write circuit is coupled to the first node, and is configured to provide a data signal from a data signal terminal to the drive circuit according to a drive signal from a drive signal terminal;

wherein the initialization circuit is configured to provide an initialization signal from an initialization signal terminal to the second node according to a reset signal from a reset signal terminal;

wherein the first light emission control circuit is configured to provide a first voltage signal from a first voltage signal terminal to the third node according to a first light emission control signal from a first light emission control signal terminal;

wherein the first storage circuit is configured to store a voltage difference between the first voltage signal terminal and the second node;

wherein the second storage circuit is configured to store a voltage difference between the first node and the second node;

wherein the second light emission control circuit is configured to control to provide the drive current to the light emitting device according to a second light emission control signal from a second light emission control signal terminal;

wherein an end of the third storage circuit is coupled to the first node, and another end of the third storage circuit is coupled to the data write circuit via a fourth node, and wherein the third storage circuit is configured to store a voltage difference between the fourth node and the first node;

wherein the first reference circuit is configured to provide a first reference signal from a first reference signal terminal to the first node according to the reset signal;

wherein the second reference circuit is configured to provide a second reference signal from a second reference signal terminal to the fourth node according to the reset signal;

wherein the method comprises:

in an initialization phase, providing the reset signal to turn on the initialization circuit, the first reference circuit and the second reference circuit, providing the initialization signal to the second node via the initialization circuit, providing the first reference signal to the first node via the first reference circuit, and providing the second reference signal to the fourth node via the second reference circuit;

in a compensation phase, providing the first light emission control signal to turn on the first light emission control circuit, providing the first voltage signal to the third node via the first light emission control circuit, and charging the first storage circuit, the second storage circuit, and the third storage circuit to compensate the drive circuit;

in a data write phase, providing the drive signal to turn on the data write circuit, to provide a data signal from the data signal terminal to the fourth node; and in a light emission phase, providing the first light emission control signal and the second light emission control signal to turn on the first light emission control circuit and the second light emission control circuit, and providing a drive current of the drive circuit to the light emitting device such that the light emitting device emits light.

10. The method according to claim 9, wherein the third storage circuit comprises:

a third capacitor, coupled between the fourth node and the first node.

11. The method according to claim 9, wherein the first reference circuit comprises:

a fifth transistor, wherein a control electrode of the fifth transistor is coupled to the reset signal terminal, a first electrode of the fifth transistor is coupled to the first reference signal terminal, and a second electrode of the fifth transistor is coupled to the first node; and wherein the second reference circuit comprises:

a sixth transistor, wherein a control electrode of the sixth transistor is coupled to the reset signal terminal, a first electrode of the sixth transistor is coupled to the second reference signal terminal, and a second electrode of the sixth transistor is coupled to the fourth node.

12. The method according to claim 9, wherein the first reference signal and the second reference signal are the same.

* * * * *